(12) United States Patent
Jess

(10) Patent No.: US 8,167,236 B2
(45) Date of Patent: May 1, 2012

(54) HYBRID LIFT AIR VEHICLE

(75) Inventor: Peter E. Jess, Calgary (CA)

(73) Assignee: Shell Technology Ventures Fund 1.B.V. (NL)

( * ) Notice: Subject to any disclaimer, the term of this patent is extended or adjusted under 35 U.S.C. 154(b) by 599 days.

(21) Appl. No.: 12/439,055

(22) PCT Filed: Aug. 27, 2007

(86) PCT No.: PCT/CA2007/001505
§ 371 (c)(1),
(2), (4) Date: Feb. 26, 2009

(87) PCT Pub. No.: WO2008/025139
PCT Pub. Date: Mar. 6, 2008

(65) Prior Publication Data
US 2010/0012771 A1    Jan. 21, 2010

(30) Foreign Application Priority Data

Aug. 29, 2006    (CA) ...................................... 2557893

(51) Int. Cl.
*B64B 1/06*    (2006.01)
(52) U.S. Cl. ......................................................... 244/29
(58) Field of Classification Search .................... 452/24, 452/25, 29–31
See application file for complete search history.

(56) References Cited

U.S. PATENT DOCUMENTS 1,026,959 A * 5/1912 Long ............................. 244/29
1,419,962 A   6/1922 Denham (Continued)

FOREIGN PATENT DOCUMENTS

CA    2002533    5/1991

(Continued)

OTHER PUBLICATIONS

Khoury, G.A. et al., *Airship Technology*, Cambridge University Press, pp. 388-408 (1999).

(Continued)

*Primary Examiner* — Richard Price, Jr.
(74) *Attorney, Agent, or Firm* — Thompson Hine L.L.P.

(57) ABSTRACT

A hybrid lift air vehicle for lifting and transporting a payload to a delivery location, which comprises a helium or other lighter-than-air gas filled envelope mounted on an airframe. Variable and reversible vertical thrusters are positioned on the airframe, and at least two variable and reversible lateral thrusters are mounted on the envelope or mounted on truss arms attached and extending out from the airframe, wherein, when the vehicle is connected to the payload for transport, the helium or other lighter-than-air gas supports or substantially supports the weight of the vehicle and the vertical thrusters are then continuously engaged to support the weight of the payload and to provide lift to the payload, wherein the lateral thrusters are then engaged to effect lateral movement of the vehicle to the delivery location, whereby, once at the delivery location, the lift provided by the variable and reversible vertical thrusters is reduced or reversed so as to allow the air vehicle to descend and the payload to again engage the ground surface, and where necessary, the variable and reversible vertical thrusters may be reversed to facilitate the unloading of the payload from the vehicle, the vehicle continuing to be kept aloft, once unloaded, by the helium or other lighter than air gas. In this manner, the vehicle utilizes the helium or lighter than air gas to offset or substantially offset the weight of the vehicle, the vertical thrusters providing the power to lift the payload.

20 Claims, 7 Drawing Sheets

U.S. PATENT DOCUMENTS

| | | | |
|---|---|---|---|
| 1,741,446 A | | 12/1929 | Turner |
| 1,838,248 A | | 12/1931 | Bourland |
| 2,707,603 A | * | 5/1955 | Moore, Jr. .................. 244/87 |
| 2,730,626 A | * | 1/1956 | Varney ..................... 250/374 |
| 3,096,047 A | | 7/1963 | Dunn, Jr. |
| 3,120,932 A | * | 2/1964 | Bernhardt .................. 244/24 |
| 3,933,326 A | | 1/1976 | Schauffler |
| 3,976,265 A | | 8/1976 | Doolittle |
| 4,014,483 A | | 3/1977 | MacNeill |
| 4,052,025 A | | 10/1977 | Clark et al. |
| 4,085,912 A | | 4/1978 | Slater |
| 4,269,375 A | | 5/1981 | Hickey |
| 4,272,042 A | | 6/1981 | Slater |
| 4,366,936 A | * | 1/1983 | Ferguson ..................... 244/2 |
| 4,402,475 A | | 9/1983 | Pavlecka |
| 4,591,112 A | | 5/1986 | Piasecki et al. |
| 4,606,515 A | * | 8/1986 | Hickey ....................... 244/29 |
| 4,685,640 A | * | 8/1987 | Warrington et al. ......... 244/29 |
| 4,799,629 A | * | 1/1989 | Mori ....................... 244/23 C |
| 4,799,914 A | * | 1/1989 | Hutchinson ................ 446/225 |
| 5,082,205 A | | 1/1992 | Caufman |
| 5,096,141 A | | 3/1992 | Schley |
| 5,294,076 A | | 3/1994 | Colting |
| 5,368,256 A | * | 11/1994 | Kalisz et al. ................ 244/26 |
| 5,383,627 A | * | 1/1995 | Bundo ......................... 244/26 |
| 5,823,468 A | * | 10/1998 | Bothe ........................... 244/2 |
| 5,906,335 A | | 5/1999 | Thompson |
| 5,931,411 A | | 8/1999 | Risser et al. |
| 6,142,414 A | * | 11/2000 | Doolittle ..................... 244/25 |
| 6,286,783 B1 | * | 9/2001 | Kuenkler ..................... 244/30 |
| 6,293,493 B1 | * | 9/2001 | Eichstedt et al. ........... 244/30 |
| 6,315,242 B1 | * | 11/2001 | Eichstedt et al. ........... 244/30 |
| 6,467,724 B2 | | 10/2002 | Kuenkler |
| 6,565,037 B1 | | 5/2003 | Tonkovich |
| 7,036,768 B2 | | 5/2006 | Bundo |
| 7,055,777 B2 | * | 6/2006 | Colting ........................ 244/30 |
| 7,156,342 B2 | | 1/2007 | Heaven, Jr. et al. |
| 7,341,224 B1 | * | 3/2008 | Osann, Jr. ..................... 244/30 |
| 7,464,895 B2 | * | 12/2008 | Palmer ......................... 244/30 |
| 7,913,948 B2 | * | 3/2011 | Porter .......................... 244/63 |
| 2005/0279880 A1 | | 12/2005 | Bundo |
| 2007/0102571 A1 | | 5/2007 | Colting |

FOREIGN PATENT DOCUMENTS

| | | |
|---|---|---|
| CA | 2024374 | 3/1992 |
| CA | 2126977 | 7/1993 |
| CA | 2165452 | 2/1995 |
| CA | 2235307 C | 5/1997 |
| CA | 2493466 A1 | 2/2004 |
| CA | 2516938 A1 | 9/2004 |
| DE | 10313243 A1 | 10/2004 |
| EP | 0201309 A2 | 11/1986 |
| FR | 2831518 B1 | 5/2003 |

OTHER PUBLICATIONS

PCT, International Preliminary Report on Patentability (Mar. 3, 2009), with Written Opinion of the International Searching Authority (Nov. 15, 2007), International Application No. PCT/CA2007/001505.

21st Century Airships-The future of flight. "Building the world's most advanced airships" at http://www.21stcenturyairships.com/AirshipFAQ.

AdvanTek International, L.L.C., Final Report for Risk Assessment of the JHL-15 Hybrid LTA Vehicle Concept. Document #: AD01-TS0007, revision 01, prepared by S. Kopf, and dated May 24, 2004.

AdvanTek International, L.L.C. JHL15 Top level requirements. Document # 072203, revision 2.

Aerospace-Technology.com: The Website for the aerospace industry. Article re the CargoLifter AG CL 160 at http://www.aerospace-technology.com/projects/cargolifter/cargolifter1.html (Nov. 16, 2005).

Howstuffworks: "How CargoLifter's Airship Will Work" by Kevin Bonsor at http://travel.howstuffworks.com/cargolifter.htm/printable (Nov. 16, 2005).

The International Air Cargo Association: "Cargo airship test successful", dated Oct. 16, 2001.

Aerospace-Technology.com: The Website for the aerospace industry. "Cargoliffer CL160 Super Heavy-Lift Cargo Airship, Germany" at http://www.aerospace-technology.com/projects/cargolifter (Nov. 16, 2005).

"Heavy Lifting Hits the Air: CargoLifter moves ahead on the next generation of airships(jumbo-sized)" by Paul Heltzel at http://www.technologyreview.com/articles/01/07/wo_heltzel071901.asp (Nov. 15, 2005).

Aerospace-Technology.com: The Website for the aerospace industry, "The vast scale of CargoLifter's hangar base . . . ," http://www.aerospace-technology.com/projects/cargolifter/cargolifters.html (Nov. 16, 2005).

Airliners.net Photos: Untitled 21st Century Airships SPAS-70 at http://www.airliners.net/open.file?id=230784&WxsIERv=21fg%20Praghel%20Nvefuvcf... (Nov. 16, 2005).

21st Century Airships. "Airship and Blimp Resources" by Roland Escher at http://www.myairship.com/database/21century.html (Nov. 16, 2005).

Photo by Bill Blanchard at http://www.airliners.net/photos/middle/4/8/7/230784.jpg (Nov. 16, 2005).

21st Century Airships, "Building the world's most advanced airships: Heavy Lifting" at http://www.21stcenturyairships.com/HeavyLift (Nov. 14, 2005).

Stats Central-Aircraft Graphical Comparisons. "StatsCentral-Military & Civilian Aircraft" at http://www.militaryfactory.com/stats-aircraft/index.asp?aircraft_id=56 (Apr. 11, 2008).

http://www.aviastar.org/foto/bvertol_chinook_1.gif (Apr. 11, 2008).

Ardema, M., "Vehicle Concepts and Technology Requirements for Buoyant Heavy-Lift Systems", NASA Technical Paper 1921, Sep. 1981. pp. 1-16.

"A Survey of Ship" by Harebin Engineering University Publication. pp. 142-143 and Figs 6-15, dated Mar. 31, 2002.

PCT Search Report dated Jul. 28, 2009 issued from PCT/CA2009/000710.

PCT, International Search Report, PCT/CA2007/001505 (dated Nov. 15, 2007; published Mar. 6, 2008).

* cited by examiner

HYBRID LIFT AIR VEHICLE

FIELD OF THE INVENTION

The present invention relates to a hybrid lift air vehicle utilizing a helium or other lighter-than-air gas filled envelope to offset all, or substantially all of the weight of the air vehicle, which air vehicle uses vertical thrusters to lift a payload and lateral thrusters to steer and move the air vehicle and payload laterally, to provide heavy payload lifts over a distance reducing, substantially eliminating or entirely eliminating the need for ballast exchange, particularly in remote locations and harsh environments.

BACKGROUND

Variable-lift devices, such as balloons or airships, are known in the art for moving or lifting heavy objects or objects of sizes that are too bulky for them to be transported by truck, train, helicopter or airplane. In general, such variable-lift devices are constituted by a balloon or airship containing helium or other lighter-than-air gases, such as neon, methane, ethane, or hydrogen, and in some cases having a gondola or platform attached to the balloon, such variable-lift devices being usually provided with a tank for storing the lighter-than-air gas under pressure. The balloon or airship is usually constituted by a flexible envelope supported by a rigid structure, consisting of an assembly of beams, a beam being an element that is long in one dimension relative to the other two dimensions.

For decades, private ventures and governments have struggled to transport heavy loads under harsh and difficult conditions and environmental circumstances, particularly in the arctic and other remote regions. As an example, it is not unusual for heavy-lift, short haul capabilities to be required on a frequent basis in the oil and gas and mineral exploration business in such regions, which may have no roads, or winter-only roads, or which include areas of environmental sensitivity. In some cases, at best, seasonal or temporary solutions have resulted, and some of these have been costly and limited in efficiency in many ways. Winter roads, for example, effective over several months of the year, are often viable in remote areas only over a progressively shortening cold winter season. Other transportation methods in remote areas over muskeg, permafrost and open water have relied, at least seasonally, on air transportation with its inherent costs and the need for substantial infrastructure to support it.

More recently, lighter-than-air (LTA) vehicles have been proposed for transporting heavy payloads in remote and arctic environments. However, the logistics associated with large ballast transfers generally associated with such vehicles presents substantial technical hurdles and costs, ballast transfer being required on vessels such as these in the past, since previous airships were based on using lighter-than-air gases to lift 100% of the weight of both the cargo and the vessel itself, and when such a traditional airship is not carrying cargo, the weight of the cargo must be replaced with ballast (typically water or sand) in order to maintain neutral buoyancy. While this is very fuel efficient and suitable for hauling heavy cargos long distances, this is impractical for hauling heavy loads in remote, harsh environments such as the arctic. Even where water is available for ballast, substantial planning and support equipment is required to ensure accessibility of ballast sources and that when water ballast is being utilized, the water is maintained above freezing to ensure quick and efficient payload drops and ballast management. Accordingly, there is a need for an improved air vehicle which can provide payload lifts over a distance without the need for ballast exchange, particularly in remote locations and harsh environments. There is also a need for an improved air vehicle which does not rely on aerodynamics to achieve lift or stay aloft, and which possesses a greater ease of manoeuverability to assist in picking up and delivering payloads. In this regard, the present invention substantially fulfills this need.

SUMMARY OF THE INVENTION

The object of the present invention is to provide an improved air vehicle which can provide payload lifts over relatively short distances without the need for ballast exchange, particularly in remote locations and harsh environments, and which utilizes a helium or other lighter-than-air gas filled envelope to offset or substantially offset the weight of the air vehicle, the variable and preferably reversible vertical thrusters providing the power to lift the payload.

It is another object of the present invention to provide an improved air vehicle which does not rely on aerodynamics to achieve lift or stay aloft, and which possesses greater manoeuverability, simplifying the picking up and delivering of payloads.

It is yet another object of the present invention to provide an improved air vehicle which possesses a greater ease of manoeuverability, due to the presence of variable and preferably reversible lateral and vertical thrusters on the air vehicle, which, in combination with the spherical lift envelope, allows for the air vehicle of the present invention to be able to rotate about a substantially vertical axis passing through a center of the air vehicle, allowing for precision, flexibility and simplified maneuvering when picking up and delivering payloads.

According to one aspect of the present invention, there is provided a hybrid lift air vehicle for lifting and transporting a payload to a delivery location, the air vehicle comprising, envelope means for containing a lighter-than-air gas and having substantially fixed dimensions and a substantially spherical shape when inflated, an airframe, an upper surface of the airframe being adapted to receive and securely mount the envelope means thereon, a plurality of variable vertical thrusters mounted in engagement with the airframe, and, at least two variable lateral thrusters, the variable lateral thrusters being mounted in engagement with the air vehicle, wherein, when the air vehicle is connected to the payload for transport, the lighter-than-air gas in the envelope means substantially supports and offsets the weight of the air vehicle, the plurality of variable vertical thrusters being engagable to generate lift and to raise and keep aloft the weight of the payload, and once aloft, the variable lateral thrusters being engagable to effect lateral movement of the air vehicle to the delivery location, whereupon, once the air vehicle is at the delivery location, the lift of the plurality of variable vertical thrusters may be reduced to lower the air vehicle until the payload again engages the ground surface for unloading of the payload from the air vehicle.

Another aspect of the present invention provides for a hybrid lift air vehicle for lifting and transporting a payload to a delivery location, the air vehicle comprising, envelope means for containing a lighter-than-air gas and having substantially fixed dimensions and a substantially spherical shape when inflated, an airframe, an upper surface of the airframe being adapted for receiving and mounting of the spherical envelope means thereon, a plurality of mounting brackets integrally connected to the outer surface of the airframe, a plurality of securing cables, wherein a first end of each of the cables is secured to a mounting bracket on the airframe, the cables extending vertically over a top portion of the envelope means, and a second end of each of the cables is secured to an opposite mounting bracket on a directly opposite side of the airframe, so as to maintain engagement of the envelope means to the airframe, a plurality of truss arms integrally connected to the airframe, and wherein each of the truss arms extends outwardly from the outer surface of the airframe, a plurality of variable vertical thrusters, each mounted on a corresponding one of the plurality of truss arms, each of the variable vertical thrusters being connected to a distal end of each of the truss arms; and at least two variable lateral thrusters, the variable lateral thrusters being mounted in engagement with the air vehicle, wherein, when the air vehicle is connected to the payload for transport, the lighter-than-air gas substantially supports and offsets the weight of the air vehicle and the plurality of variable vertical thrusters are engagable to lift and keep aloft the air vehicle and payload, wherein the at least two variable lateral thrusters are engagable to effect lateral movement of the air vehicle to the delivery location, whereby, once at the delivery location, the lift of the plurality of variable vertical thrusters is reduced to lower the air vehicle and the payload to the ground surface for unloading of the payload from the air vehicle.

Yet another aspect of the present invention provides for a method for lifting and transporting a payload to a delivery location utilizing the air vehicle of the present invention, the method comprising the steps of utilizing the lighter-than-air gas to substantially support and offset a weight of the air vehicle off a ground surface, and utilizing the variable vertical thrusters to lift the air vehicle and payload, utilizing the variable lateral thrusters to position the air vehicle above the payload on the ground surface, attaching the payload to the air vehicle, continuously engaging the plurality of variable vertical thrusters to raise and keep aloft the air vehicle and the payload, engaging the at least two variable lateral thrusters to effect lateral movement of the air vehicle to the delivery location, and reducing the lift of the plurality of variable vertical thrusters, once at the delivery location, so as to cause the air vehicle to descend and enable the payload to again engage the ground surface and disengaging the payload from the air vehicle.

The advantage of the present invention is that it provides an improved air vehicle which can provide payload lifts over a distance without the need for ballast exchange, particularly in remote locations and harsh environments, and which utilizes a helium or lighter-than-air gas filled envelope to support, or substantially support and offset the weight of the air vehicle, thus allowing the variable vertical thrusters to provide the power to lift the payload.

Further, the present invention provides an improved air vehicle which does not rely on aerodynamics to achieve lift, stay aloft or provide for control of the vehicle (steering and maneuvering). This is because the present invention provides a spherical helium (or lighter-than-air gas filled) lift envelope, as opposed to a traditional cigar shaped air vehicle, which relies on fins to steer and thus require airflow to flow over them, much like a rudder. During takeoffs and landings, there is little to no airflow flowing over such fins of conventional lighter-than-air vehicles, thus requiring much assistance from ground crews to help launch and retrieve traditional air vehicles. Further, such conventional lighter-than-air vehicles are typically moored by the bow, and have to be able to swivel 360 degrees as the wind changes requiring a very large landing pad. The landing pad of an 60 meter air vehicle such as in one embodiment of the present invention will typically be less than 120 meters in diameter.

A further advantage of the present invention is that spherical helium (or lighter-than-air gas filled) lift envelopes, such as that utilized by the present invention, are less expensive, both to manufacture and operate, than conventional non-spherical, dirigible type or cigar shaped air vehicles.

A still further advantage of the present invention is that it provides an improved air vehicle which possesses greater manoeuverability, due to its spherical shape and the presence of variable and preferably reversible lateral and vertical thrusters on the air vehicle. This, in combination with the spherical helium (or lighter-than-air gas filled) lift envelope, allows for the air vehicle of the present invention to be able to rotate about a substantially vertical axis passing through a center of the air vehicle, allowing for precision, flexibility and simplified maneuvering when picking up and delivering payloads.

BRIEF DESCRIPTION OF THE DRAWINGS

A preferred embodiment of the present invention is described below with reference to the accompanying drawings, in which.

DESCRIPTION OF THE PREFERRED EMBODIMENT

As described herein, the present invention provides an improved air vehicle which can provide payload/heavy payload lifts over a distance without the need for ballast exchange, particularly in remote locations and harsh environments, and which utilizes a helium or other lighter-than-air gas filled envelope to fully or substantially offset, support and lift the weight of the air vehicle, the variable (and preferably reversible) vertical thrusters providing the lifting power to lift the payload.

As an example, in one embodiment of the present invention, the air vehicle of the present invention can handle a load in the range of up to 40 tons up to 100 nautical miles (in other embodiments, the typical loads and distances generally expected would be reduced to, for example, 20 tons over a distance of 50 to 80 nautical miles, it being understood that larger or small air vehicles may be built as needed to provide the desired lift and range requirements needed for such a vehicle).

Figure 1:
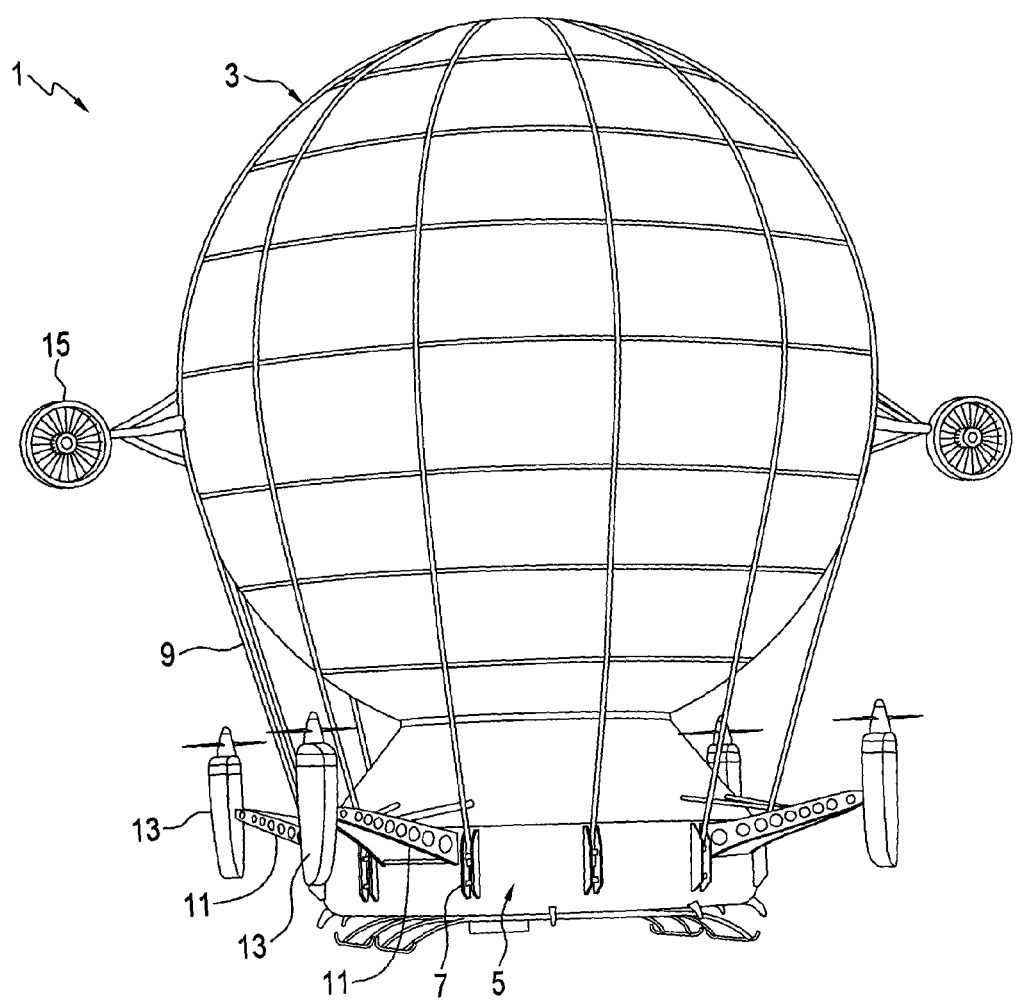
FIG. 1 is a front view of an embodiment of the air vehicle of the present invention.
Figure 2:
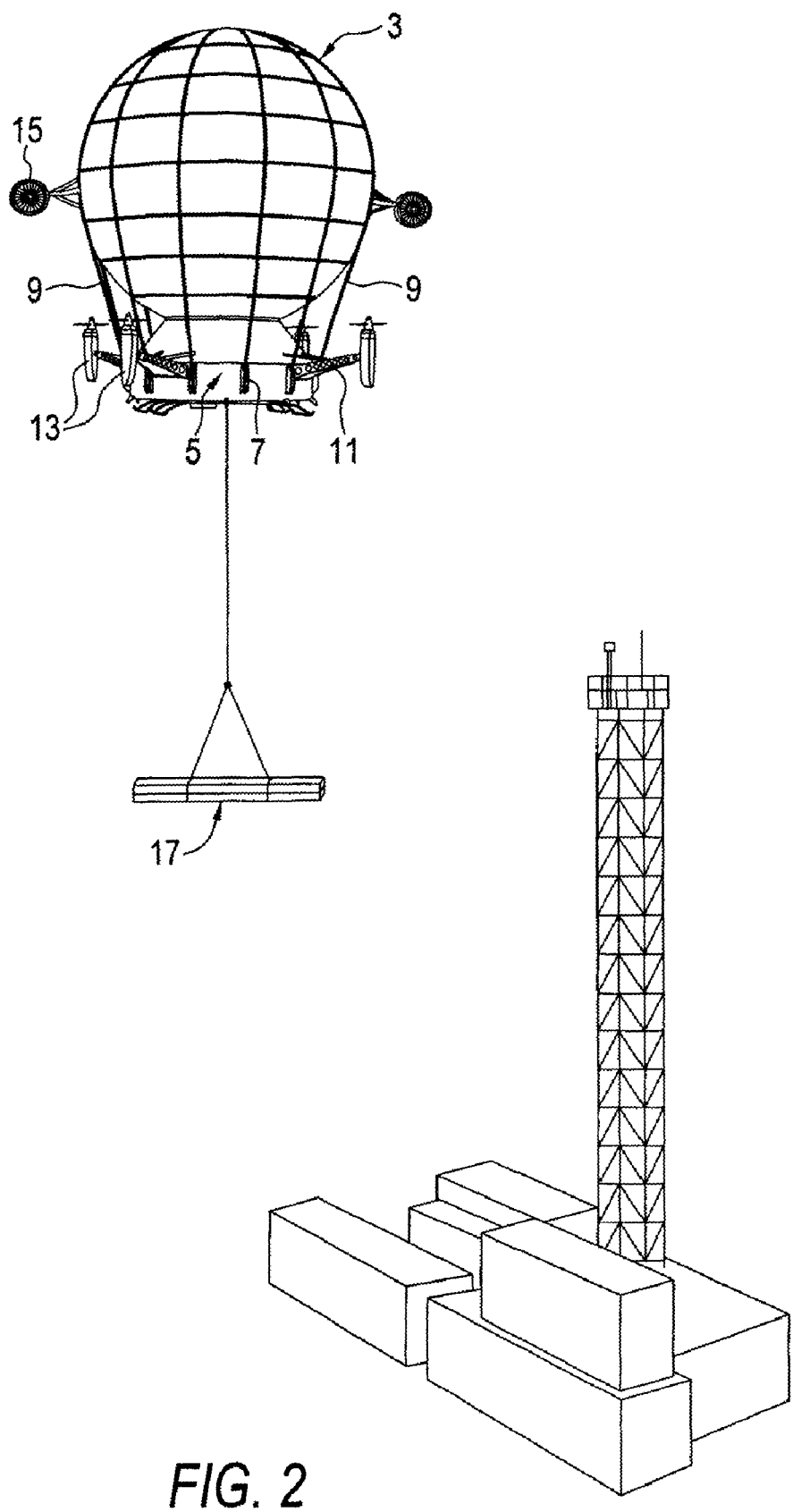
FIG. 2 is an illustration of an embodiment of the air vehicle of the present invention, which shows the air vehicle supporting a transport load en route to a delivery location.

Referring to FIGS. 1 and 2, the air vehicle (1) according to the present invention comprises a lighter-than-air gas-containing envelope (3) adapted to contain a lighter-than-air gas, which, in the preferred embodiment, is helium, though it would be apparent to others skilled in the art that other gases could be utilized (hereinafter, when reference is made to helium, it is to be understood that reference is also being made to other inert lighter-than-air gases as would be known to a person skilled in the art). In one embodiment of the present invention, the helium in the spherical envelope can be heated, which has the added advantage that when heated, helium inhibits ice and snow accumulation from occurring on the outer surface of the spherical envelope. In an alternative embodiment of the present invention, an acoustic or other vibrational frequency may be applied to the skin of the envelope to shed any accumulated snow or ice. The envelope (3) may be a substantially all-fabric structure whose shape is maintained through internal gas pressures, such as by maintaining air pressure in an inner balloon (ballonet) within the spherical envelope, as is known in the art, with the fabric being preferably a Dacron polyester reinforced laminate, which is the standard material on most modern airships, it being understood that alternative materials may be utilized as would known to a person skilled in the art. In one embodiment of the present invention, the uppermost portion of the spherical envelope has attached thereto by a way of straps or cables, for example, a ridged ring or other device (27), that would enable a helicopter or other air vehicle to attach to the air vehicle of the present invention (by way of the ridged ring or other device) to allow the helicopter or other air vehicle to tow or lift the air vehicle of the present invention if necessary. In a still further embodiment of the present invention, an entry access port or door 29 is provided on the envelope, to allow access inside of the ballonet for inspections and repairs, if necessary.

The gas envelope (3) is mounted upon an airframe (5), an upper surface of the airframe preferably having a concave depression therein for the receiving and mounting of the envelope (3) thereon. In an alternative embodiment of the present invention, a cushion ring or bumpers, of inflated foam or other suitable materials, could also be provided between the envelope and the airframe to minimize friction between the envelope and the airframe. In one embodiment of the present invention, the upper surface of the airframe is provided with a retaining ring mounted thereon, on which the gas envelope is securely positioned, which retaining ring diameter would correspond to the circumference of the concave depression.

Figure 5A:
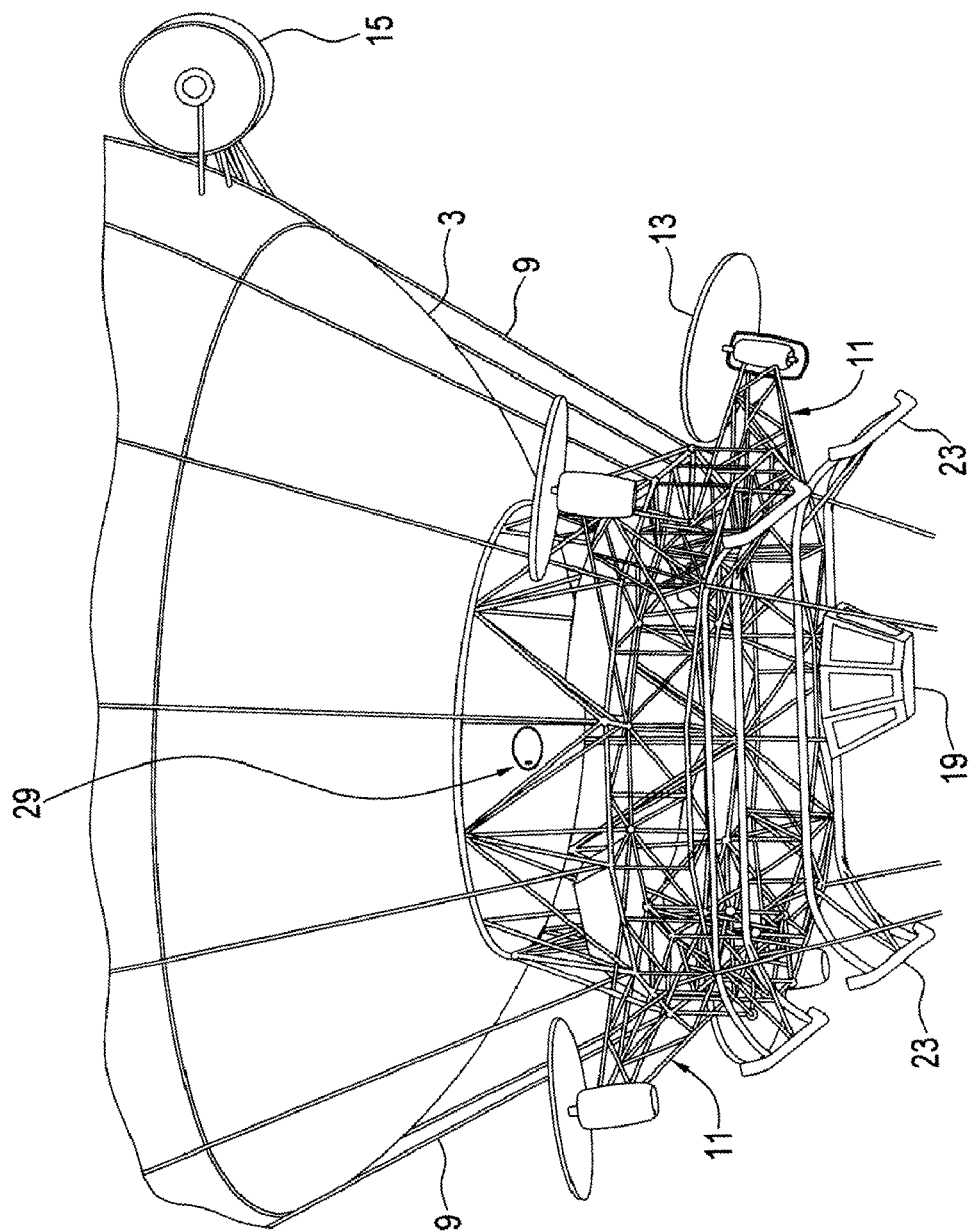
FIG. 5A is a front view of an embodiment of the airframe structure for the air vehicle of the present invention, the airframe structure being shown without the outer covering skin.
Figure 5B:
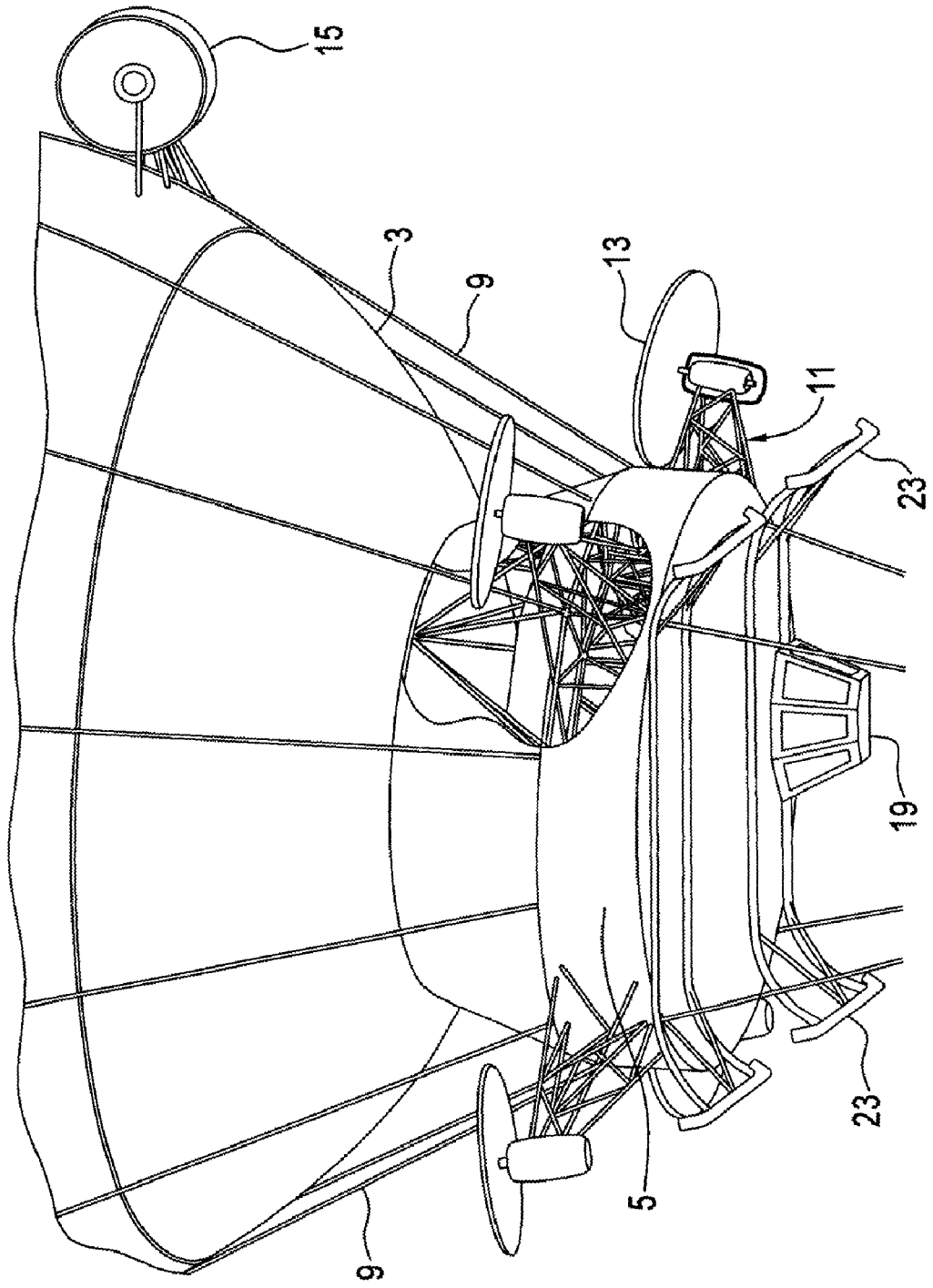
FIG. 5B is a front view of the embodiment of the airframe structure for the air vehicle of the present invention shown in FIG. 5A, the airframe structure being shown with the outer covering skin being partially cutaway.

In a preferred embodiment of the present invention, and as can be seen in FIGS. 5A and 5B, the airframe (5) is an aircraft-aluminum truss structure (which has preferably been bolted or riveted together) with, as illustrated in FIG. 5B, an outer skin or skirt, which can be, for example, a flexible laminate. Preferably, the instrumentation, flight controls and avionics of the air vehicle of the present invention are conventional and commercially available components.

In a preferred embodiment of the present invention, the airframe consists of a base ring, an outer covering skin or skirt, and truss arms to support the variable and reversible vertical thrusters (as hereinafter described). In one embodiment of the present invention, the base ring consists of twelve individual truss sections that are bolted or riveted together to form a 10 meter diameter ring that is 1.75 meters in height, though it will be apparent to others skilled in the art that other sizes, variations and arrangements could be utilized. These truss sections are, preferably, fabricated of bolted or riveted aluminum tubing.

With reference to FIG. 5A, the base ring serves as the mounting point for the outer skin or skirt, the cockpit (19) and the truss arms (11). The internal volume of the base ring is sufficient to house all of the major flight systems, as well as fuel storage. Cable mounting brackets (7) are integrally connected to the airframe (5), each of the mounting brackets being, in a preferred embodiment, substantially equidistant about a center of the airframe (5) and a substantially equal distance from each other, it being understood that in alternative embodiments of the present invention, alternative positioning arrangements of the cable mounting brackets may be utilized.

In one embodiment of the present invention, to maintain engagement of the envelope (3) to the airframe (5), securing cables (9) are utilized, wherein a first end of each of the cables (9) is secured to a cable mounting bracket (7) on the airframe (5), the cables extending substantially vertically over a top portion of the envelope (3), wherein a second end of each of the cables is secured to an opposite mounting bracket on a directly opposite side of the airframe, it being understood that "cables" can also include straps of material having sufficient strength, tensile and flexibility properties, as would be apparent to one skilled in the art. In alternative embodiments of the present invention, alternative methods for maintaining a secure engagement of the envelope to the airframe may be utilized in a manner known to a person skilled in the art.

Truss arms (11) are also integrally connected to the airframe (5), each of the truss arms (11) being, in a preferred embodiment, substantially equidistant each other and equidistant the center of the airframe, each truss arm being positioned such that each truss arm is spaced equally about the circumference of the airframe (it being understood that in alternative embodiments of the present invention, alternative positioning arrangements of the truss arms may be utilized). As can be seen in FIG. 1, each of the truss arms (11) preferably extends outwardly from the outer surface of the airframe (5).

In the preferred embodiment of the present invention, connected to the distal end of each of the truss arms is a variable (and preferably reversible) vertical thruster (13), mounted on each truss arm (13). In the preferred embodiment of the present invention, 4 variable and reversible vertical thrusters are equally spaced about the circumference of the airframe, it being understood that 3 equally spaced variable and reversible vertical thrusters or more than 4 equally spaced variable and reversible vertical thrusters may be utilized in accordance with the present invention, it also being understood that alternative spacing arrangements may be utilized as would be understood by a person skilled in the art.

Preferably, the variable and reversible vertical thrusters are large variable and reversible pitch propellers or rotors driven by, for example, a gas turbine engine (directly, or preferably by way of a gearbox or power transfer case in a manner known to a person skilled in the art), which gas turbine engine is either vertically or horizontally oriented, it being understood that when a horizontally oriented gas turbine engine is utilized, a power transfer case adapted to convert the power output from the horizontal shaft of the gas turbine engine to the vertical shaft of the variable pitch propellers or rotors is utilized. In an alternative embodiment of the present invention, the propeller or rotor of the variable and reversible vertical thruster is connected to the distal end of each of the truss arms and the gas turbine engine is located at a distance from the variable and reversible vertical thruster, for example, within the airframe structure, and connected by gearbox, power transfer case and drive shaft to the propeller or rotor. In one embodiment of the present invention, a Pratt & Whitney PW 100 series engine may be utilized for each thruster, it being understood that a wide range of alternative engines, engine sizes and engine configurations may be utilized (for example, one engine may drive all four thrusters, or two or more engines may drive all four thrusters, or each thruster may be driven by its own engine), depending on, for example, the load capacity of the air vehicle and such other factors as would be known to a person skilled in the art. Alternatively, engines such as those used for a hovercraft can be utilized. In one embodiment of the present invention, pitch control of the rotor blades is provided using a swash plate arrangement similar to that used in modem helicopters to direct and control the thrust of the rotor as desired. It should also be understood that it is conceivable that the variable and reversible vertical thrusters could be rotated in such a manner as to provide for vertical thrust vectoring/rotation, so as to provide directional control and stability as well as lift, as would be apparent to one skilled in the art.

In the preferred embodiment of the present invention, a helium filled envelope is utilized to wholly or substantially lift, support and offset the weight of the air vehicle, and the weight of the payload being lifted utilizing the variable and preferably reversible vertical thrusters. In one embodiment of the present invention, a helium filled envelope having a typical diameter of between 80 feet and 150 feet is utilized to offset or substantially offset the weight of the air vehicle (the diameter of the helium envelope being such that when filled with helium, it can substantially or wholly lift, support and offset the weight of the air vehicle, it being understood that variously sized envelopes may be utilized depending upon the overall weight of the air vehicle and such other factors as would be known to a person skilled in the art).

Figure 6:
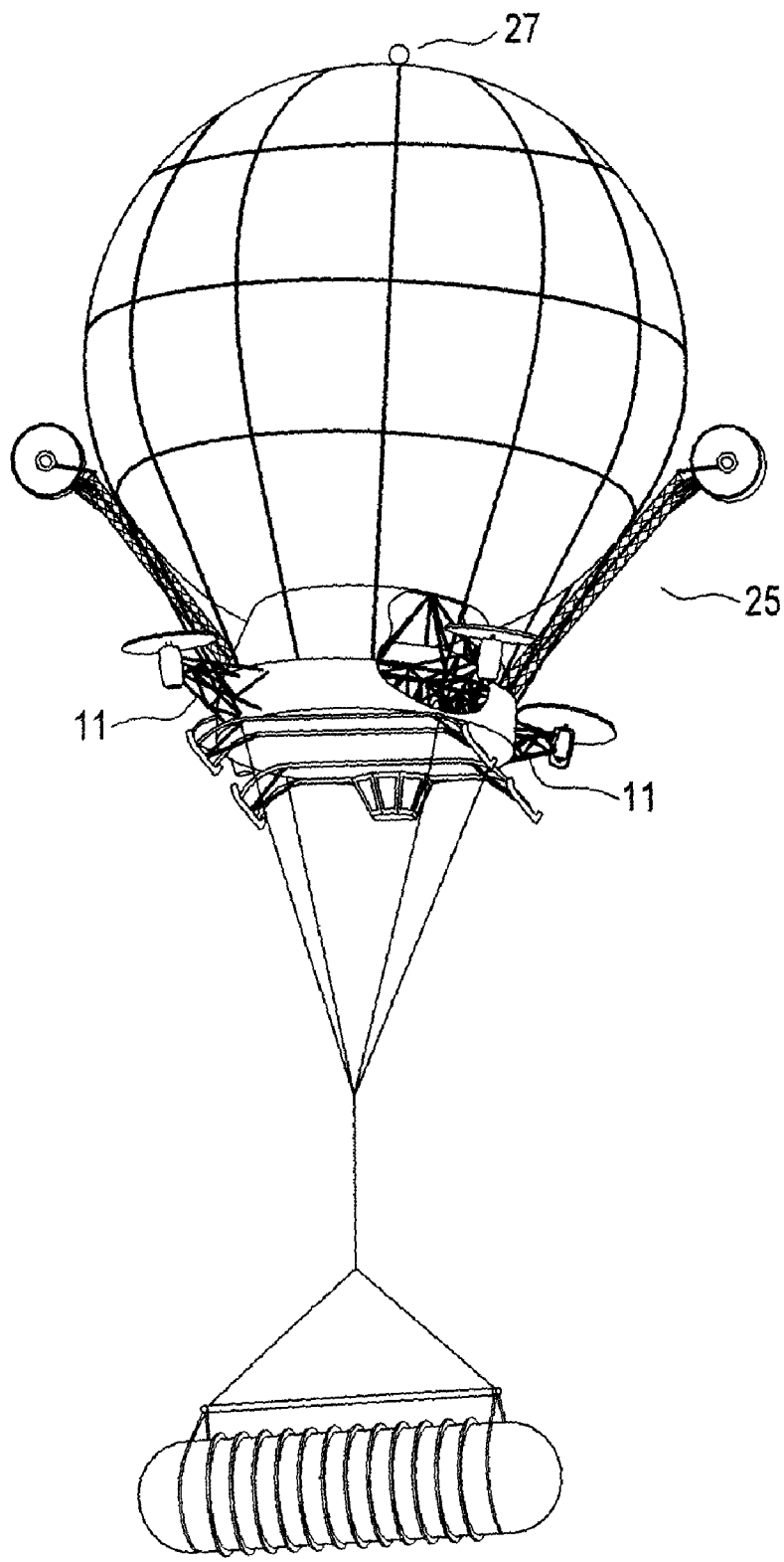
FIG. 6 is a front view of an alternative embodiment of the air vehicle of the present invention, and which illustrates the truss arms which extend from the airframe supporting each of the variable lateral thrusters.

In the preferred embodiment of the present invention, the variable vertical thrusters are reversible, so that as fuel is burned off during flight (and as the air vehicle's overall weight is reduced by the amount of fuel burned), when the air vehicle arrives at its destination, the air vehicle may be significantly more buoyant than at the commencement of the flight, which may require that the vertical thrusters be reversed to generate upwardly directed thrust to offset the excessive buoyancy of the now lightened air vehicle, the reversed thrust of the vertical thrusters forcing the air vehicle toward the ground against the buoyant force of the lightened air vehicle. In an alternative embodiment of the present invention, the variable thrusters are variable but non-reversible for use in limited environments where it is not necessary to utilize reverse (upwardly directed) thrust, for example, when the overall weight of the air vehicle will never be fully offset by the buoyancy of the lighter-than-air gas. In a further alternative embodiment of the present invention, one or more auxiliary upwardly directed vertical thrusters are provided on the air vehicle, which when engaged will, in the normal operation of such auxiliary upwardly directed vertical thrusters, provide upwardly directed thrust or supplement the reverse thrust of the vertical thrusters, on an as-needed basis. In a preferred embodiment of the present invention, at least two variable and reversible lateral thrusters (15) are mounted on truss arms (25) attached to the airframe as illustrated in FIG. 6, the two lateral thrusters being preferably substantially equidistant from the center of the spherical envelope (3), which truss arms can, for example, further encompass a stairway therein whereby access to the lateral thrusters from the airframe can be provided, so as to effect maintenance, repairs or the like. In an alternative embodiment of the present invention, the variable and reversible lateral thrusters (15) can be mounted onto the outer surface of the spherical envelope, which outer surface has preferably been structurally enhanced in the area where the thrusters are mounted to distribute the load of the lateral thrusters in a manner known to a person skilled in the art, the variable and reversible lateral thrusters preferably being mounted on opposing sides of (and preferably substantially equidistant from the center of) the envelop to provide improved balance, control and stability during operation. In a further alternative embodiment of the present invention, the variable and reversible lateral thrusters may be positioned on an outer surface of the airframe, in a manner known to a person skilled in the art.

It is also understood that the lateral thrusters can be pivoted, or the thrust therefrom vectored as needed to provide for lateral thrust vectoring/rotation to a degree, so as to provide lift as well as directional control, as would be apparent to one skilled in the art.

Preferably, the lateral thrusters are reversible, and, when used in conjunction with one another to thrust in a same direction, selectively propel the air vehicle in a forward direction or a backward direction, as desired. Use of the lateral thrusters also allows the vehicle to rotate about a substantially vertical axis passing through the center of the vehicle, thus providing a greater ease of manoeuverability of the air vehicle and in picking up and delivering payloads.

When the air vehicle is not carrying a payload, the weight of the air vehicle is offset or substantially offset by the lifting force of the helium gas, requiring only a minimal amount of fuel by the lateral thrusters to propel the air vehicle laterally and a minimal amount of fuel by the vertical thrusters to change altitude. In one embodiment of the present invention, the lateral thrusters are each powered by their own engine located proximate the lateral thruster. In an alternative embodiment of the present invention, the lateral thrusters, by means of a drive shaft, power transfer case and/or gear box may by driven by an engine positioned, for example, within the airframe structure. In one embodiment of the present invention, trim thrusters may be provided, which may be mounted on the vehicle at appropriate locations, and which may be electrically, hydraulically or otherwise powered, to provide supplement the control and maneuverability of the air vehicle.

In one embodiment of the present invention, the air vehicle of the present invention could also be provided with an auxiliary power source, such as an electrical power source, for providing power to any electrically powered thrusters (for example, trim thrusters) in an emergency (such as a turbine failure) and to provide power to the control systems, the ballonet system (to maintain the spherical shape of the envelope) and to provide power to the human environmental systems.

In the preferred embodiment of the present invention, a lifting line is provided for attaching the payload to the air vehicle in a conventional manner. It should also be understood that the air vehicle of the present invention is preferably provided with the ability to release a payload quickly from the lifting line (or to release the lifting line itself from the air vehicle) in an emergency, such as the "quick release" mechanism provided on some helicopter slings, as would be apparent to one skilled in the art.

In one embodiment of the present invention, a mooring winch is provided which may be utilized to assist in precisely positioning the air vehicle as needed. In one embodiment of the present invention, lighting can be positioned on a lower surface of the airframe to selectively illuminate the space directly below the air frame and the payload supported therefrom to assist the ground crew in positioning, loading and unloading of the payload. In one embodiment of the present invention, and as can be seen in FIGS. 3, 4, 5A and 5B, landing skids (23) can be positioned on a lower surface of the airframe for landing purposes.

Utilizing the present invention to lift, transport and lower a payload to a delivery location is accomplished in three steps.

In the first step, the pilot positions the air vehicle over an area with the lateral thrusters so that the ground crew (not shown) can attach a lifting line (21), as seen in FIGS. 5A and 5B, to the payload. In an alternative embodiment of the present invention, a winch (not shown) may also be securely positioned on a lower surface of the airframe, the winch being utilized to raise or lower the lifting line (21). In one embodiment of the present invention, a mooring winch (not shown) is positioned on a lower surface of the airframe, which, in use, would secure the vehicle to a fixed point on the ground, as would be apparent to one skilled in the art. Once the lifting line is attached to the payload, the pilot applies power to the vertical thrusters to generate just enough downwardly directed vertical thrust to remove slack from the lifting line and to center the vehicle above the payload. As soon as the payload is confirmed as being properly secured, and any ground crew in a safe location, the pilot applies more vertical thrust until the payload is lifted completely from the ground. In a preferred embodiment, the air vehicle of the present invention is designed to operate in an altitude of 3,000 to 6000 feet above departure level, though it will be readily apparent to workers skilled in the art that variations thereto may be effected.

Figure 3:
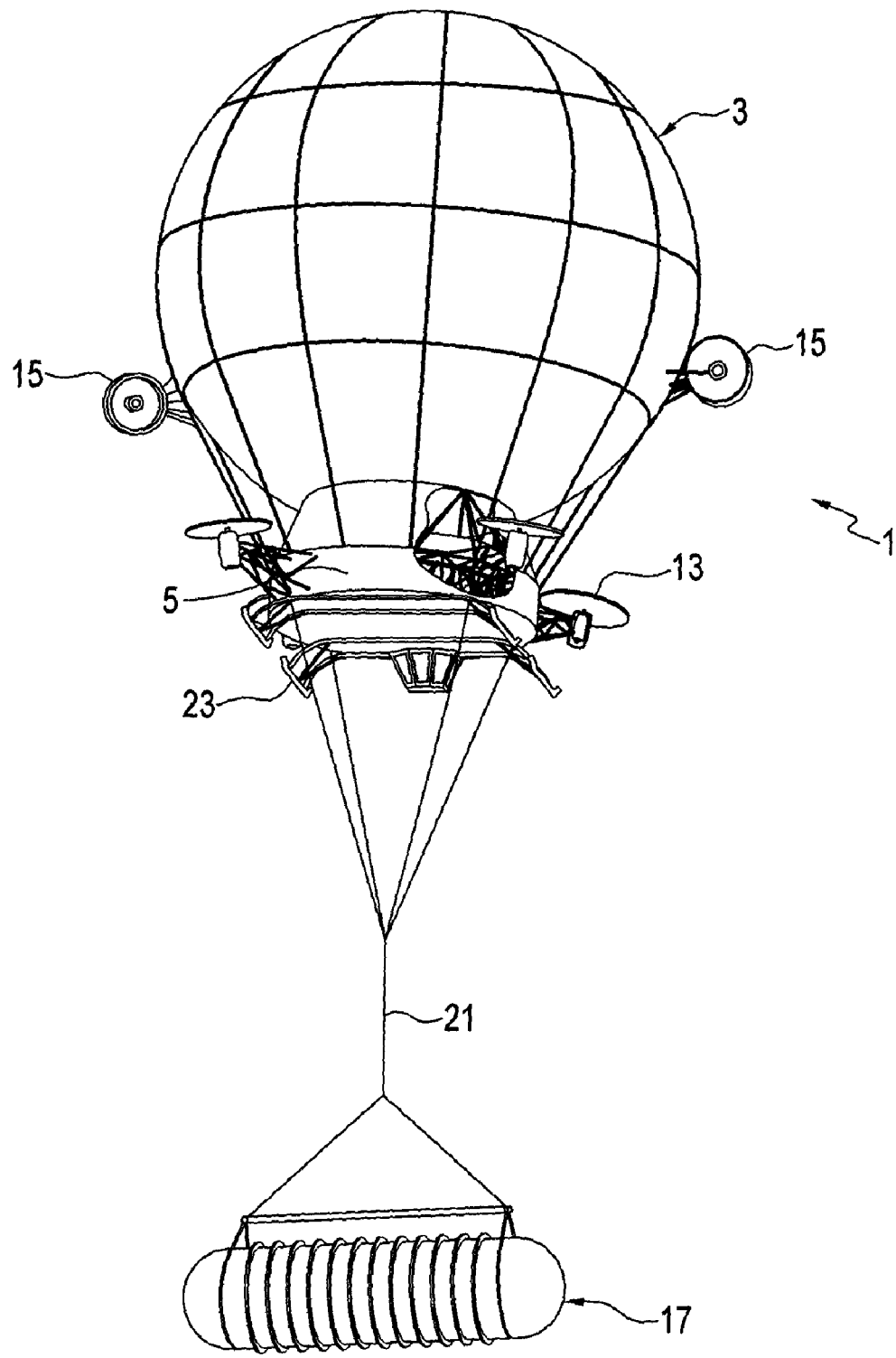
FIG. 3 is a front view of another embodiment of the air vehicle of the present invention, wherein the airframe is shown having landing skids on an underside thereof.
Figure 4:
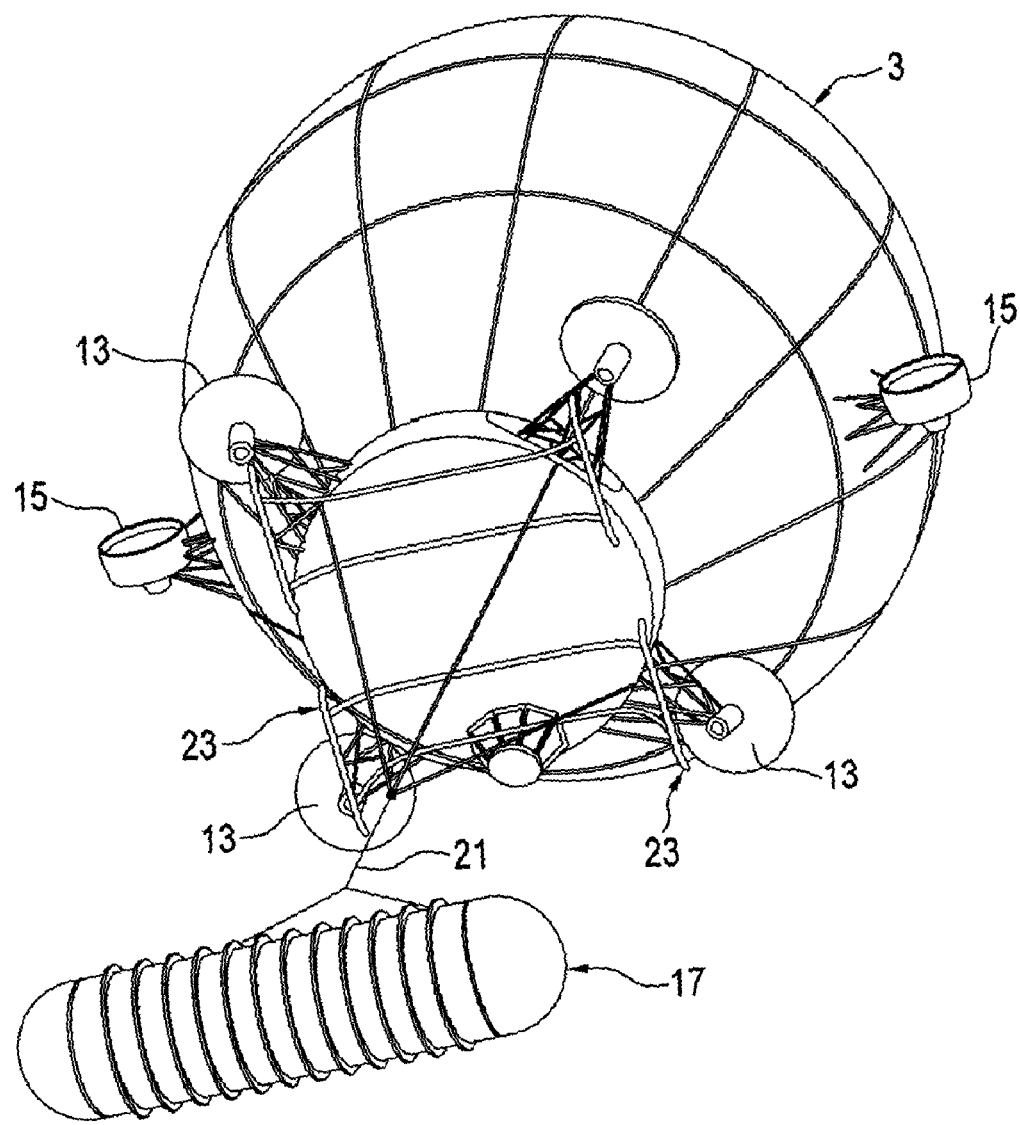
FIG. 4 is a bottom perspective view of the embodiment shown in FIG. 3.

In the second step, as can be seen in FIGS. 2, 3 and 4, the pilot utilizes the lateral thrusters to transport the air vehicle (1), and the payload (17), to the delivery location, which preferably is within a range of between 0 and 100 miles from the position from which the payload was lifted (it being understood that where desirable, air vehicles having a longer range may be built in accordance with the present invention) preferably at an airspeed of between 35 to 60 miles per hour (it being understood that where desirable, air vehicles having airspeeds beyond this range may be built in accordance with the present invention, and it being understood that in some circumstances, operations of air vehicles at speeds of less than 35 miles per hour may be preferred for reasons of safety, fuel conservation and other factors known to a person skilled in the art). In one embodiment of the present invention, a transportable fuel tank may be positioned along the route of a proposed flight of the air vehicle so as to enable refueling en route, if necessary and to permit an extended range for the air vehicle.

The third step is the set-down of the payload at the set-down point. In a preferred embodiment of the present invention, the approach to the set-down point will begin 1 to 2 miles away from the set-down point. Preferably, the pilot will approach the set-down point with the air vehicle moving into the prevailing wind. As the vehicle slows, the pilot will use the lateral thrusters to position the load, reduce lift thrust slightly on the variable vertical thrusters to slowly lower the payload to the ground surface and, if extreme accuracy is required, the ground crew can attach tag lines and small winches to pull the load precisely into position, much like in crane operations. As soon as the load is on the ground, the pilot will further reduce the lift thrust in the vertical thrusters (or where required, put the vertical thrusters into reverse to overcome the current buoyancy of the air vehicle as the relative buoyancy of the air vehicle may be increased due to the amount of fuel burned en route to the set-down point) until the lifting cable is slack, wherein the ground crew will remove the payload from the line and the air vehicle can proceed to its next destination.

It will also be understood that the present invention may also feature an emergency helium gas exhaust system to permit the rapid release of helium gas from the gas envelope, which system, working in tandem with a fuel dumping system, would, in the event of a turbine engine failure be used by the pilot to control the altitude of the air vehicle (the helium gas exhaust system would enable the exhaust of some helium gas at a controlled rate and thus allow for the vehicle to become negatively buoyant in a controlled manner, while the fuel dumping system would enable the jettisoning of fuel at a controlled rate and thus allow for the air vehicle to become positively buoyant). The systems would combine to enable the air vehicle to (without a payload) achieve neutral buoyancy or to change its buoyancy to avoid obstacles. In the worst case scenario, they could be used to create a gentle rate of descent and to provide for a run-on landing similar to the manner in which it is done by hot-air-balloons today (and in the event that the air vehicle has trim thrusters installed thereon which are available for use in such emergencies, the trim thrusters may be used by the pilot to align the air vehicle during descent so that the air vehicle's skids are aligned parallel to the direction of travel, to thereby to minimize damage to the air vehicle as it lands). In the preferred embodiment of the present invention, these systems could be powered by auxiliary power systems, or backup power systems and/or batteries or some other source as would be known to a person skilled in the art. As a final backup system, a rapid helium release device may be provided in the upper portion of the envelope so that in the case of a run on landing, the pilot can jettison the helium instantly, deflating the envelope and thereby preserving the airframe and other hardware components.

It is important to note that the air vehicle of the present invention consumes a significant amount of fuel flying loaded to a destination, the reduction of fuel weight requiring the pilot to slowly and continuously reduce the power to the vertical thrusters to keep the vehicle from gaining altitude. Once the load is discharged, the air vehicle may be positively buoyant because the take-off weight has now been lowered by the amount of fuel burned and the air vehicle will no longer be supporting the now unloaded payload. This will necessitate the pilot reversing the thrust from the variable and reversible vertical thrusters in order to keep the air vehicle from ascending, the reverse thrust being achieved in the present invention by reversing the blade pitch on the propellers or rotors in a manner known to a person skilled in the art.

The present invention has been described herein with regard to preferred embodiments. However, it will be obvious to persons skilled in the art that a number of variations and modifications can be made without departing from the scope of the invention as described herein.

What is claimed is:

1. A hybrid lift air vehicle for lifting and transporting a payload above a ground surface to a delivery location, the air vehicle comprising:
   a. envelope means for containing a lighter-than-air gas and having substantially fixed dimensions and a substantially spherical shape when inflated;
   b. an airframe, an upper surface of the airframe being adapted to receive and securely mount the envelope means thereon;
   c. a plurality of variable vertical thrusters mounted in engagement with the airframe; and
   d. at least two variable lateral thrusters, the variable lateral thrusters being mounted in engagement with the air vehicle;
   wherein, when the air vehicle is connected to the payload for transport, the lighter-than-air gas in the envelope means substantially supports and offsets the weight of the air vehicle, the plurality of variable vertical thrusters being engagable to generate lift and to raise and keep aloft the weight of the payload, and once aloft, the variable lateral thrusters being engagable to effect lateral movement of the air vehicle to the delivery location, whereupon, once the air vehicle is at the delivery location, the lift of the plurality of variable vertical thrusters may be reduced to lower the air vehicle until the payload again engages the ground surface for unloading of the payload from the air vehicle.

2. The air vehicle of claim 1, wherein the plurality of variable vertical thrusters are reversible.

3. The air vehicle of claim 1, wherein the at least two variable lateral thrusters are reversible.

4. The air vehicle of claim 1, wherein each variable vertical thruster is mounted to the airframe by a truss arm having proximal end securely engaged with the airframe and having a distal end to which the variable vertical thruster is mounted.

5. The air vehicle of claim 1, wherein each variable lateral thruster is mounted on the envelope means.

6. The air vehicle of claim 1, wherein each variable lateral thruster is mounted to the airframe by a truss arm having proximal end securely engaged with the airframe and having a distal end to which the variable lateral thruster is mounted.

7. The air vehicle of claim 1, wherein each of the at least two variable lateral thrusters allow the vehicle to rotate about a substantially vertical axis of the vehicle.

8. The air vehicle of claim 1, wherein the upper surface of the airframe has a concave depression therein which is adapted to receive and securely mount the envelope means to the upper surface of the airframe.

9. The air vehicle of claim 1, wherein a retaining ring is mounted onto the upper surface of the airframe, the envelope means being received and mounted on the retaining ring.

10. The air vehicle of claim 1, wherein the at least two variable lateral thrusters, when used in conjunction with one another to thrust in a same direction, selectively propels the air vehicle in a forward direction or a backward direction.

11. The air vehicle of claim 1, wherein the lighter-than-air gas in the envelope means is helium.

12. The air vehicle of claim 1, wherein the envelope means has an outer surface and the lighter-than-air gas in the envelope means is heated helium to inhibit icing or snow accumulation on the outer surface of the envelope means.

13. The air vehicle of claim 1, wherein the variable vertical thrusters comprise a variable pitch propeller driven by a gas turbine engine.

14. The air vehicle of claim 1, wherein the variable vertical thrusters comprise a variable rotor driven by a gas turbine engine.

15. The air vehicle of claim 1, wherein the variable lateral thrusters comprise a variable pitch propeller driven by a gas turbine engine.

16. The air vehicle of claim 1, wherein the variable lateral thrusters comprise a variable rotor driven by a gas turbine engine.

17. A hybrid lift air vehicle for lifting and transporting a payload above a ground surface to a delivery location, the air vehicle comprising:
   a. envelope means for containing a lighter-than-air gas and having substantially fixed dimensions and a substantially spherical shape when inflated;
   b. an airframe, an upper surface of the airframe being adapted for receiving and mounting of the spherical envelope means thereon;
   c. a plurality of mounting brackets integrally connected to the airframe;
   d. a plurality of securing cables, wherein a first end of each of the cables is secured to a mounting bracket on the airframe, the cables extending vertically over a top portion of the envelope means, and a second end of each of the cables is secured to an opposite mounting bracket on a directly opposite side of the airframe, so as to maintain engagement of the envelope means to the airframe;
   e. a plurality of truss arms integrally connected to the airframe, and wherein each of the truss arms extends outwardly from the outer surface of the airframe;
   f. a plurality of variable vertical thrusters, each mounted on a distal end of a corresponding one of the plurality of truss arms; and
   g. at least two variable lateral thrusters, the variable lateral thrusters being mounted in engagement with the air vehicle;
   wherein, when the air vehicle is connected to the payload for transport, the lighter-than-air gas substantially supports and offsets the weight of the air vehicle and the plurality of variable vertical thrusters are engagable to lift and keep aloft the air vehicle and payload, wherein the at least two variable lateral thrusters are engagable to effect lateral movement of the air vehicle to the delivery location, whereby, once at the delivery location, the lift of the plurality of variable vertical thrusters is reduced to lower the air vehicle and the payload to the ground surface for unloading of the payload from the air vehicle.

18. A method for lifting and transporting a payload utilizing the air vehicle of claim 1, the method comprising the steps of:
   a. utilizing the lighter-than-air gas to substantially support and offset the weight of the air vehicle off the ground surface, and utilizing the vertical thrusters to lift the air vehicle and payload;
   b. utilizing the variable lateral thrusters to position the air vehicle above the payload on the ground surface;
   c. attaching the payload to the air vehicle;
   d. continuously engaging the plurality of variable vertical thrusters to raise and keep aloft the air vehicle and the payload;
   e. engaging the at least two variable lateral thrusters to effect lateral movement of the air vehicle to the delivery location; and
   f. reducing the lift of the plurality of variable vertical thrusters, once at the delivery location, so as to cause the air vehicle to descend and enable the payload to again engage the ground surface; and
   g. disengaging the payload from the air vehicle.

19. The air vehicle of claim 1, further comprising a payload attachment means for connecting the payload to the airframe.

20. The air vehicle of claim 1, further comprising a payload attachment means for releasably connecting the payload to the airframe.

* * * * *